US012673665B2

(12) United States Patent
Sans

(10) Patent No.: US 12,673,665 B2
(45) Date of Patent: Jul. 7, 2026

(54) METHOD FOR OPTIMISING THE ENERGY CONSUMPTION OF A MOTOR VEHICLE

(71) Applicant: VITESCO TECHNOLOGIES GmbH, Regensburg (DE)

(72) Inventor: Mariano Sans, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 15 days.

(21) Appl. No.: 18/838,443

(22) PCT Filed: Feb. 7, 2023

(86) PCT No.: PCT/EP2023/052909
§ 371 (c)(1),
(2) Date: Aug. 14, 2024

(87) PCT Pub. No.: WO2023/156247
PCT Pub. Date: Aug. 24, 2023

(65) Prior Publication Data
US 2025/0145144 A1     May 8, 2025

(30) Foreign Application Priority Data

Feb. 15, 2022     (FR) ...................................... 2201303

(51) Int. Cl.
*B60W 20/15*          (2016.01)
*B60W 10/06*          (2006.01)
(Continued)

(52) U.S. Cl.
CPC ............ *B60W 20/15* (2016.01); *B60W 10/06* (2013.01); *B60W 10/08* (2013.01); *B60W 50/0097* (2013.01)

(58) Field of Classification Search
CPC ...... B60W 20/15; B60W 10/06; B60W 10/08; B60W 50/0097; B60W 20/16; B60W 40/00
See application file for complete search history.

(56) References Cited

U.S. PATENT DOCUMENTS 9,205,831 B2     12/2015     Dextreit
9,599,049 B2     3/2017     Zavala Jurado et al.
(Continued)

FOREIGN PATENT DOCUMENTS

CN          104249736 B          6/2016
CN          103921786 B          8/2016
(Continued)

OTHER PUBLICATIONS

J. Bernard, et al., "Global Optimisation in the power management of a Fuel Cell Hybrid Vehicle (FCHV)", IEEE Vehicle Power and Propulsion (VPP) Conference, Sep. 6-8, 2006, 9 pages.
(Continued)

*Primary Examiner* — Frederick M Brushaber
(74) *Attorney, Agent, or Firm* — NIXON & VANDERHYE

(57)          ABSTRACT

The invention relates to a method for optimizing the energy consumption of a motor vehicle comprising a battery (30), an internal combustion engine (M), an electric machine ($M_E$), a plurality of devices, each characterized by at least one state variable, and a computer (40) capable of controlling the internal combustion engine (M) and the electric machine ($M_E$),
  said method being notable in that it comprises the steps of:
  a) defining a prediction period,
  b) determining the maximum theoretical variation of each state variable over the prediction period,
      (Continued)

c) determining the range of applicable setpoints in which each setpoint value is selected so that the variation of each state variable satisfies the maximum theoretical variation thereof, d) determining the value of an internal combustion setpoint and the value of an electric setpoint, in the range of applicable setpoints, for which the Hamiltonian function is lowest.

4 Claims, 1 Drawing Sheet

(51) Int. Cl.
B60W 10/08 (2006.01)
B60W 50/00 (2006.01)

(56) References Cited

U.S. PATENT DOCUMENTS

| | | | | |
|---|---|---|---|---|
| 10,125,712 | B2 | 11/2018 | Livshiz et al. | |
| 10,807,589 | B2 | 10/2020 | Thibault et al. | |
| 11,964,575 | B2 * | 4/2024 | Hase | B60L 53/12 |
| 12,365,327 | B2 * | 7/2025 | Yamaguchi | B60W 50/0205 |
| 2012/0296503 | A1 * | 11/2012 | Miwa | B60W 30/1884 |
| | | | | 903/903 |
| 2020/0101966 | A1 | 4/2020 | Thibault et al. | |
| 2023/0347865 | A1 | 11/2023 | Ritzmann et al. | |
| 2024/0017714 | A1 * | 1/2024 | Kawanishi | B60W 20/13 |

FOREIGN PATENT DOCUMENTS

| | | |
|---|---|---|
| CN | 106080584 A | 11/2016 |
| CN | 106080585 A | 11/2016 |
| CN | 105501216 B | 11/2017 |
| CN | 110562239 A | 12/2019 |
| CN | 110775043 A | 2/2020 |
| DE | 102013014667 A1 | 3/2015 |
| GB | 2483371 A | 3/2012 |
| WO | 2018104850 A1 | 6/2018 |
| WO | 2021229526 A1 | 11/2021 |

OTHER PUBLICATIONS

Richard F. Hartl, et al., "A Survey of The Maximum Principles for Optimal Control Problems With State Constraints", Society for Industrial and Applied Mathematics, SIAM Review, vol. 37, No. 2, Jun. 1995, pp. 181-218 (38 pages).

M.A.S. Kamal, et al., "Eco-driving using real-time optimization", 2015 European Control Conference (ECC) Jul. 15-17, 2015, 6 pages.

Tobias Nüesch, et al., "Equivalent Consumption Minimization Strategy for the Control of Real Driving NOx Emissions of a Diesel Hybrid Electric Vehicle", Energies, vol. 7, published May 12, 2014, pp. 3148-3178 (31 pages).

A. Sciarretta, et al., "Optimal ecodriving control: energy-efficient driving of road vehicles as an optimal control problem", IEEE Control Systems Magazine, Institute of Electrical and Electronics Engineers, vol. 35, No. 5, 2015, pp. 71-90 (53 pages).

Emmanuel Trelat, "Contrôle optimal: théorie et applications", Université Pierre et Marie Curie (Paris 6) et Institut Universitaire de France, 2013, 263 pages.

International Search Report and Written Opinion of the ISA for PCT/EP2023/052909 dated Feb. 27, 2023, 16 pages.

* cited by examiner

METHOD FOR OPTIMISING THE ENERGY CONSUMPTION OF A MOTOR VEHICLE

CROSS-REFERENCE TO RELATED APPLICATIONS

This application is the U.S. national phase of International Application No. PCT/EP2023/052909 filed Feb. 7, 2023 which designated the U.S. and claims priority to FR Patent Application No. 2201303 filed Feb. 15, 2022, the entire contents of each of which are hereby incorporated by reference.

TECHNICAL FIELD

The present invention relates to optimizing the energy consumption of a motor vehicle, and more particularly to a method for optimizing the energy consumption of a motor vehicle on a predefined route. The invention particularly aims to generate optimized setpoints for controlling the vehicle on said route to be traveled, minimizing energy consumption.

PRIOR ART

In a motor vehicle, it is known practice to optimize the energy consumption of the drive train on a given or predicted route. Such optimization can be performed in relation to the fuel, in relation to the electrical energy, or in relation to both at once.

As is known, optimization can be performed using the principle known by the name Pontryagin's maximum principle (PMP). This method consists of minimizing the Hamiltonian function (or Hamiltonian) on the basis of the criterion to be optimized, for example the quantity of fuel or the electrical energy consumed, and the description of the dynamics of the system. The dynamics of the system are defined on the basis of the state of different variables of the vehicle (speed of the vehicle, state of charge of the battery, etc.) and different inputs or setpoints (torque setpoints to be applied to the wheels of the vehicle for the internal combustion engine, torque setpoints to be applied to the wheels of the vehicle for the electric machine, and/or catalytic converter heating setpoints, and/or cooling circuit control setpoints). The Hamiltonian function is minimized in order to determine the setpoints that make it possible to obtain the minimum fuel or electrical energy consumption.

Each input or setpoint is dependent on the state of certain variables. For example, the torque setpoint for the electric machine to be applied to the wheels of the vehicle is dependent on the speed of the vehicle and the state of charge of the battery, the cooling circuit control setpoint is dependent on the temperature in real time in the cooling circuit, and the catalytic converter heating setpoint is dependent on the temperature in real time in the catalytic converter.

The Hamiltonian determined in this way is then minimized. In other words, the values of the setpoints for which the value of the Hamiltonian is lowest are selected and applied to the vehicle.

The setpoint values are thus determined in real time as a function of the current state of the system. In addition, the setpoints must in particular be adjusted when the state of each state variable has reached the limits set. The limits on the state variables are referred to as state constraints, and pose problems that are well known in the art, in particular a problem in the a posteriori adjustment of the optimum setpoints calculated a priori.

It is thus sometimes proposed to add additional terms to the formula of the Hamiltonian in order to minimize it when certain limits of the setpoints or state variables are reached, or even exceeded. However, adding such terms also introduces an artificial bias into the Hamiltonian, which, when it is minimized, can fail to indicate the correct set of optimum setpoints to minimize the required criterion.

There is therefore a need for a solution that makes it possible to at least partially overcome these drawbacks.

SUMMARY OF THE INVENTION

To this end, the invention relates to a method for optimizing the energy consumption of a motor vehicle, the vehicle comprising a fuel tank, an electric battery capable of supplying electrical energy, an internal combustion engine powered by the fuel tank, at least one electric machine powered by electrical energy supplied by the battery, at least one device relating to the internal combustion engine and at least one device relating to the electric machine, and a computer for managing the drive train of the motor vehicle on a predetermined route, the computer being capable of controlling the internal combustion engine by issuing a so-called "internal combustion" setpoint and the electric machine by applying a so-called "electric" setpoint, the internal combustion engine, the electric machine, the at least one device relating to the internal combustion engine, and the at least one device relating to the electric machine each being characterized by at least one state variable, each state variable making it possible to describe the operating state of the device that it characterizes, each state variable being dependent on at least one state constraint and being defined by an initial value at an initial time, each setpoint being associated with at least one state variable, said method being notable in that it comprises the steps of:

a) defining a prediction period starting from the initial time, b) determining the maximum theoretical variation of each state variable from the initial value of said state variable and over the prediction period so that each state variable satisfies all of the state constraints specific thereto, c) determining the range of applicable setpoints comprising a set of values for each setpoint, each setpoint value being selected so that the variation of each state variable associated with said setpoint satisfies the maximum theoretical variation determined for said state variable, d) determining the value of an internal combustion setpoint and the value of at least one electric setpoint in the range of applicable setpoints determined, for which the Hamiltonian function is lowest.

The method is implemented for a predefined/given route for the vehicle.

The method according to the invention makes it possible to define torque setpoints in order to supply the power and acceleration requested by the driver during the operation of the vehicle on the given or predicted route, while minimizing the energy consumption of the vehicle. In addition, during the step of determining the range of applicable setpoints, the values of each setpoint that do not satisfy the at least one constraint applied to a state variable of the system are eliminated. The internal combustion and electric setpoints determined thereafter are thus necessarily included in the range of applicable setpoints and can effectively be applied to the system.

Preferably, the value of each setpoint is determined:

a. by determining so-called "optimum" setpoints by minimizing the Hamiltonian of a system of equations modeling the dynamics of the vehicle, in the range of applicable setpoints, b. by minimizing the Lagrangian function modeling the dynamics of the vehicle, the Lagrangian function being determined from the previously determined Hamiltonian and from so-called Karush-Kuhn-Tucker parameters relating to the state constraints, in the full range of setpoints, comprising all of the setpoints.

In other words, the functions representing the state constraints used to calculate the Lagrangian function are weighted by so-called Karush-Kuhn-Tucker (KKT) parameters calculated so that the optimum setpoints determined by minimizing said Lagrangian function in the full range of setpoints, correspond to the optimum setpoints obtained by minimizing the Hamiltonian function in the range of applicable setpoints reduced to only the setpoints that satisfy the state constraints considered.

Preferably, the Karush-Kuhn-Tucker parameters $\mu$ are determined so that the solution that minimizes the Hamiltonian in the range of applicable setpoints also minimizes the Lagrangian function in the full range.

The invention also relates to a computer for managing the drive train of a motor vehicle on a predetermined route, the vehicle comprising a fuel tank, an electric battery capable of supplying electrical energy, an internal combustion engine powered by the fuel tank, an electric machine powered by electrical energy supplied by the battery, at least one device relating to the internal combustion engine and at least one device relating to the electric machine, and a computer for managing the drive train of a motor vehicle on a predetermined route, the computer being capable of controlling the internal combustion engine by issuing a so-called "internal combustion" setpoint and the electric machine by applying a so-called "electric" setpoint, the internal combustion engine, the electric machine, the at least one device relating to the internal combustion engine, and the at least one device relating to the electric machine each being characterized by at least one state variable, each state variable making it possible to describe the operating state of the device that it characterizes, each state variable being dependent on at least one state constraint and being defined by an initial value at an initial time, each setpoint being associated with at least one state variable, the computer being notable in that it is configured to:

a) define a prediction period starting from the initial time, b) determine the maximum theoretical variation of each state variable from the initial value of said state variable and over the prediction period so that each state variable satisfies all of the state constraints specific thereto, c) determine the range of applicable setpoints comprising a set of values for each setpoint, each setpoint value being selected so that the variation of each state variable satisfies each maximum theoretical variation determined for said state variable, d) determine the value of an internal combustion setpoint and the value of at least one electric setpoint in the range of applicable setpoints determined, for which the Hamiltonian function is lowest.

The computer thus makes it possible to determine torque setpoints in order to supply the power and acceleration requested by the driver during the operation of the vehicle on the given or predicted route, while minimizing the energy consumption of the vehicle. In addition, during the step of determining the range of applicable setpoints, the values of each setpoint that do not satisfy the at least one constraint applied to a state variable of the system are eliminated. The internal combustion and electric setpoints determined thereafter are thus necessarily included in the range of applicable setpoints and can effectively be applied to the system.

Preferably, the computer is configured to determine the value of each setpoint:

a. by determining so-called "optimum" setpoints by minimizing the Hamiltonian of a system of equations modeling the dynamics of the vehicle, in the range of applicable setpoints, determined previously and comprising the selection of the setpoints for which each state variable satisfies the state constraints specific thereto, b. by minimizing the Lagrangian function modeling the dynamics of the vehicle, the Lagrangian function being determined from the previously determined Hamiltonian and from so-called Karush-Kuhn-Tucker parameters relating to the state constraints, in the full range of setpoints, comprising all of the setpoints.

In other words, the applicable setpoints are reduced to only the setpoints that satisfy the state constraints and are optimum by calculating the Karush-Kuhn-Tucker parameters.

More preferably, the computer is configured to determine the Karush-Kuhn-Tucker parameters $\mu$ so that the solution that minimizes the Hamiltonian in the range of applicable setpoints also minimizes the Lagrangian function in the full range.

The invention also relates to a vehicle comprising an internal combustion engine, powered by a fuel tank, an electric machine powered by electrical energy, and a computer for managing the drive train as described above.

The invention also relates to a computer program product, notable in that it comprises a set of program code instructions, which, when they are executed by one or more processors, configure the one or more processors to implement a method as described above.

DESCRIPTION OF THE DRAWINGS

Further features and advantages of the invention will become more clearly apparent upon reading the following description. This description is purely illustrative and should be read with reference to the appended drawings, in which.

DESCRIPTION OF THE EMBODIMENTS

Vehicle

Figure 1:
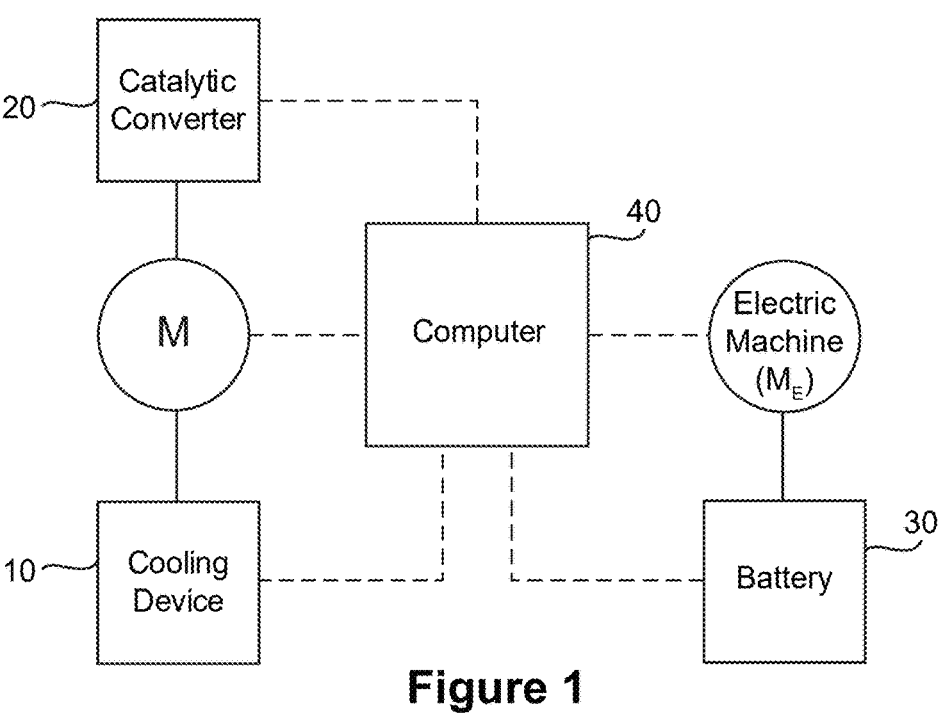
FIG. 1 is schematic view of the vehicle according to the invention.

With reference to FIG. 1, an embodiment of the vehicle according to the invention will now be described. The vehicle is in particular hybrid and therefore comprises an internal combustion engine M, often referred to as an ICE, and at least one electric machine $M_E$, often referred to as an EMA, a fuel tank, and a battery 30 for supplying electricity.

The internal combustion engine M is in particular capable of being powered using fuel supplied by the tank. The internal combustion engine M also comprises an exhaust system for the exhaust gases emitted on combustion of the air and fuel mixture in the internal combustion engine M.

The vehicle also comprises at least one device relating to the internal combustion engine M and in particular a device 10 for cooling the internal combustion engine M and a catalytic converter 20. The cooling device 10 makes it possible to reduce the temperature of the internal combustion engine M during the use thereof. The cooling device 10 comprises in particular a coolant.

The catalytic converter 20, connected to the internal combustion engine M by the exhaust system, is capable of reducing the quantity of pollutants in the exhaust gases emitted by the internal combustion engine M before discharging them outside the vehicle.

The catalytic converter 20 also comprises a heating device capable of increasing the temperature in the catalytic converter 20, in order to implement the pollution reduction of the exhaust gases. The heating device of the catalytic converter 20 must be powered by electrical energy in order to operate.

The electric machine $M_E$ is capable of being powered by electrical energy supplied by the battery 30. The vehicle also comprises at least one device relating to the electric machine $M_E$, in particular a set of voltage converters (not shown) making it possible to convert the voltage between the battery 30 and the electric machine $M_E$.

The vehicle can comprise other devices relating to the internal combustion engine M and other devices relating to the electric machine $M_E$.

"System" refers to all of the elements mounted in the vehicle that are capable of consuming or producing electrical energy or fuel. For example, the system comprises all of the devices described above: the internal combustion engine M, the electric machine $M_E$, the cooling device, the catalytic converter 20, and the battery 30.

Each device is characterized by at least one state variable that makes it possible to describe the operating state of the device. For example, the cooling device 10 is characterized by a coolant temperature. By way of further example, the catalytic converter 20 is characterized by an internal temperature value.

The battery 30 is characterized by a state of charge variable, the internal combustion engine M s characterized by a rotation speed, an applied torque, etc.

Each state variable is characterized by at least one state constraint relating to the physics of the system. For example, the temperature of the coolant of the cooling device 10 is characterized by a maximum temperature, the internal temperature of the catalytic converter 20 is characterized by a minimum temperature, and the state of charge of the battery 30 must be between a predefined minimum value and maximum value. In general, each state constraint value is predefined but can be modified during the operation of the device in question.

In other words, the state constraints make it possible to define the variation limits of each state variable. As explained above, the state of charge of the battery 30 must always be defined between the minimum value and the maximum value so that the battery 30 can operate correctly.

Computer

The vehicle also comprises a computer 40 connected to the internal combustion engine M, to the electric machine $M_E$, to the at least one device relating to the internal combustion engine M, in other words to the cooling device 10 and to the catalytic converter 20, and to the at least one device relating to the electric machine $M_E$, in other words to the battery 30.

The computer 40 is capable of receiving the measurement of each state variable value relating to each device. In addition, the computer 40 is capable of controlling each device to which it is connected, by issuing a setpoint, as a function of the value or values of variables relating to said device.

In other words, each setpoint is associated with at least one state variable relating to the device controlled by said setpoint.

In addition, each setpoint issued is dependent on the state constraint or constraints relating to said device.

Thus, for example, the setpoint issued to the internal combustion engine M denotes the value of the torque to be applied to the internal combustion engine M and is in particular a function of the speed of the vehicle and the power requested by the driver of the vehicle. By way of further example, the setpoint issued to the electric machine $M_E$ denotes the torque to be applied to the electric machine $M_E$ and is a function of the state of charge of the battery 30 and of the power requested by the driver.

The setpoint issued to the catalytic converter 20 relates to the temperature in the catalytic converter 20 and is a function of the temperature measured in the catalytic converter 20 and the state constraints described above.

The setpoint issued to the cooling device 10 relates to the temperature of the coolant and is dependent on the measured temperature of the coolant and the state constraints described above.

The computer 40 is also capable of determining the maximum theoretical variation of each state variable from the initial value of each variable, between an initial time and the end of the period to be considered, so that the variation of each state variable satisfies all of the state constraints specific thereto.

The initial time can be defined as the time at which the theoretical variation is determined, whether this is when the vehicle is started or any other time after the starting of the vehicle and during the operation of the vehicle.

The computer 40 is also configured to determine the range of applicable setpoints comprising a set of values for each setpoint, each setpoint value being selected by the computer 40 so that the variation of each state variable of the system satisfies the maximum theoretical variation determined for said state variable.

The computer 40 is also configured to implement the PMP method, in other words the Pontryagin's maximum principle method, by determining the Hamiltonian function H (x, u*, λ) from the different setpoint values of the range of applicable setpoints.

The computer 40 is also configured to calculate, for all of the state constraints, the Lagrangian function: L (x, u*, λ, μ) and therefore the Karush-Kuhn-Tucker (KKT) parameters μ, known to a person skilled in the art, so that the Lagrangian function: L (x, u*, λ, μ) is minimal in the full range of setpoints, comprising all of the setpoints and not only the setpoints selected in the range of applicable setpoints.

The computer 40 comprises a processor capable of implementing a set of instructions for carrying out these functions.

Method

Figure 2:
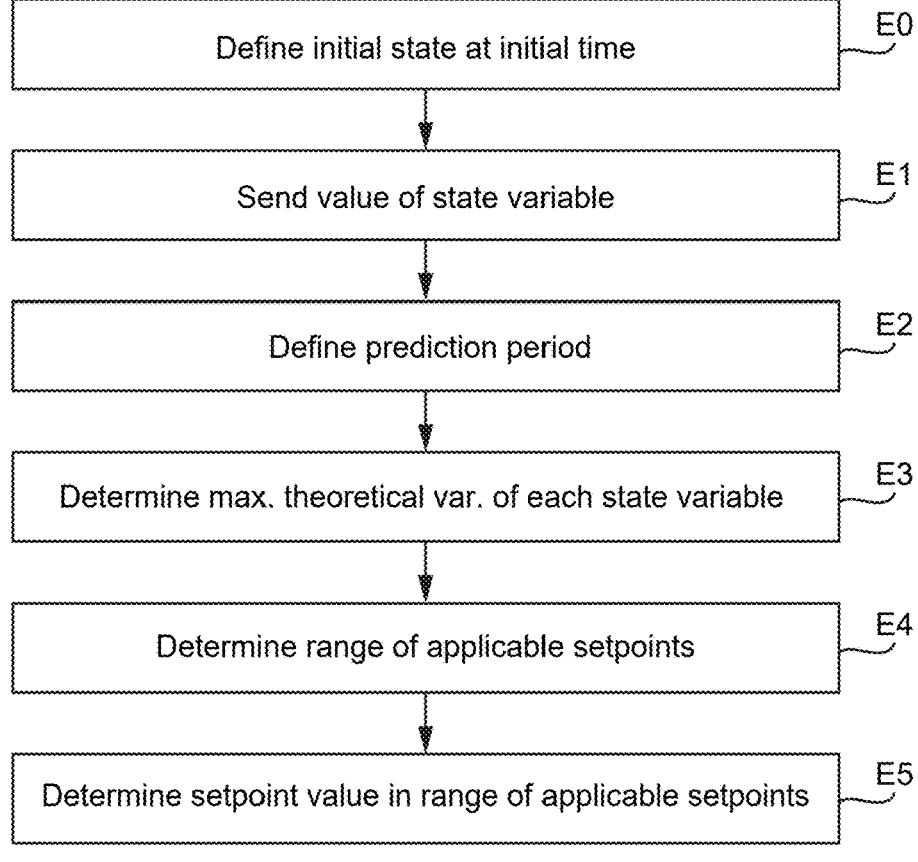
FIG. 2 is an illustration of the method according to the invention.

With reference to FIG. 2, an embodiment will now be described of the method for optimizing the energy consumption of the vehicle according to the invention, implemented by a computer 40 as described above.

The criteria to be optimized therefore relate to the fuel and electrical energy consumption of the vehicle.

In order to simplify the description, the different variables considered are as follows: the torque of the internal combustion engine M, the temperature of the coolant of the cooling device 10, and the temperature in the catalytic converter 20.

Other parameters could be considered, such as the torque of the electric machine $M_E$, or parameters relating to the at least one device relating to the electric machine $M_E$.

The method firstly comprises a step E0 of defining an initial state at an initial time. The initial time can be defined at any time during the operation of the vehicle, from starting to stopping. At the initial time, each state variable is defined by a value.

Following the step E0 of defining an initial state, the method comprises a step E1 of sending the value of each state variable at the initial time to the computer 40. According to the example described here, the computer 40 therefore receives the value of the torque of the internal combustion engine M, the temperature of the coolant of the cooling device 10, and the temperature in the catalytic converter 20.

The method then comprises a step E2 of defining a so-called "prediction" period dH, to be considered starting from the initial time. For example, the computer 40 defines that the prediction period dH to be considered is 10 seconds.

The method also comprises a step E3 of determining the maximum theoretical variation of each state variable. The maximum theoretical variation is defined over the prediction period dH and in particular starting from the initial time, so that each variable satisfies all of the state constraints specific thereto. In other words, the determining step E3 therefore corresponds to a step of predicting the value of each state variable as a function of time during the defined period to be considered. According to a first example, when a variable is limited by a minimum value Xmin, the value x of the variable must always be greater than the minimum value Xmin over the period to be considered. This is in particular the case for the value of the temperature in the catalytic converter 20.

In this step, a maximum theoretical variation Xth is determined for each state variable using its so-called "state" equation giving the gradient of this state variable, and determined over a predefined prediction period dH.

The following is thus obtained:

Xth≥Xmin, where Xth=x+dx/dt(x,u)·dH

And where:

i. dH defines the prediction period to be considered, ii. Xth corresponds to the predicted value of the theoretical variation over the prediction period dH, iii. x corresponds to the value of the state variable, iv. dx/dt(x,u) defines the dynamic model of the state variable of the device as a function of the values of predefined physical parameters (in particular the torque curve of the internal combustion engine M and of the electric machine $M_E$, the efficiency table of an internal combustion engine M, and the capacity of the battery) and setpoint values u to be applied to the variable.

For example, for a prediction period dH defined at 10 seconds, when the value of the temperature in the catalytic converter 20 must be greater than 60° C., and the initial value of the temperature in the catalytic converter 20 is 80° C., then it is not possible to reduce the value of the temperature in the catalytic converter by more than 2° C. per second so that the temperature in the catalytic converter 20 is still greater than the constraint, in other words greater than 60° C.

According to a second example, when a state variable is limited by a maximum value Xmax, which is in particular the case for the value of the temperature of the coolant of the cooling device 10, the value x of the variable must always be less than the maximum value Xmax over the period to be considered.

The following is thus obtained:

Xth≤Xmax, where Xth=x+dx/dt(x,u)·dH

For example, for a prediction period dH defined at 10 seconds, when the value of the temperature of the coolant must be less than 90° C., and the initial value of the temperature of the coolant is 70° C., then it is not possible to increase the value of the temperature of the coolant by more than 2° C. per second so that the temperature of the coolant is still less than the constraint, in other words less than 90° C.

The determining step E3 thus makes it possible here to determine the maximum theoretical variation of the variable while satisfying the constraint or constraints of said variable.

When the step E3 of determining the maximum theoretical variation of each state variable has been carried out, the method then comprises a step E4 of determining the range of applicable setpoints. The range of applicable setpoints comprises a set of values for each setpoint, each setpoint value being selected so that the variation of each state variable satisfies the maximum theoretical variation of said state variable, determined during the preceding step.

According to the first example, the determining of the range of applicable setpoints could be modeled as follows:

$$(dx/dt(x, u)) \geq (X\min - x)/dH$$

The range of applicable setpoints thus comprises all of the setpoint values u that satisfy the inequality above and therefore comprises setpoint values u for which the variation of the state variable x is greater than the minimum value Xmin.

According to the second example, the determining of the range of applicable setpoints could be modeled as follows:

$$(dx/dt(x, u)) \leq (X\max - x)/dH$$

The range of applicable setpoints thus comprises all of the setpoint values u that satisfy the inequality above and therefore comprises setpoint values u for which the variation of the state variable x is less than the maximum value Xmax.

In other words, during the step E4 of determining the range of applicable setpoints, the computer 40 excludes the values of each setpoint that do not satisfy at least one state constraint applied to a state variable associated with said setpoint.

The method then comprises a step E5 of determining the setpoint value in the range of applicable setpoints determined previously, for which the energy consumption is lowest.

More specifically, during the determining step E5, the computer 40 uses the PMP method, in other words the Pontryagin's maximum principle method, and determines the Hamiltonian function H (x, u*, λ) of all of the equations modeling the dynamics of the vehicle and from the different setpoint values of the range of applicable setpoints. The computer 40 then determines all of the so-called "optimum" setpoints by minimizing the Hamiltonian function determined.

Adjunct states λ are also introduced (also referred to as "adjunct parameters", "Lagrange parameters", "adjunct vectors", or "co-state vectors").

These adjunct states are associated with the state equations that represent the conditions of the dynamic behavior of the physical system, and will allow the optimization problem to be solved completely.

During the determining step E5, the computer 40 calculates, for all of the state constraints, the Karush-Kuhn-Tucker (KKT) parameters $\mu$, known to a person skilled in the art, so that the Lagrangian function: L (x, u*, $\lambda$, $\mu$) is minimal in the full range of the setpoints. The Lagrangian is determined as a function of the Karush-Kuhn-Tucker parameters $\mu$, themselves defined as a function of the state constraints and calculated so that the optimum setpoints determined previously minimize the Lagrangian function. The computer 40 thus calculates the Karush-Kuhn-Tucker parameters $\mu$ so that the derivative of the Lagrangian function is zero at the points of the optimum setpoints obtained.

First Scenario

For example, when the computer 40 determines the KKT parameter $\mu$ when a single device is capable of causing the energy consumption of the vehicle to vary and the computer 40 therefore issues setpoints to a single device and each state variable only depends on a single constraint, then:

$$\left. \begin{array}{l} L(q, u, \lambda, \mu) = H + \mu^T \cdot h\prime \\ \dfrac{\partial L}{\partial u_{(u=u^*)}} = 0 \end{array} \right\} \Rightarrow \mu = -\dfrac{\partial H}{\partial u_{(u=u^*)}} \bigg/ \dfrac{\partial h\prime}{\partial u_{(u=u^*)}}$$

The function h denotes the equation that describes the constraint applied to a state variable x.

According to the first example, when a state variable is limited by a minimum value Xmin, then x≥Xmin, in other words Xmin−x≤0. The function h corresponds to (Xmin−x).

According to the second example, when a state variable is limited by a maximum value Xmax, then x≤Xmax, in other words x−Xmax≤0. The function h corresponds to (x−Xmax).

The function h' denotes the equation that describes the constraint applied to the variation of the state variable x predicted over the prediction period dH.

According to the first example, when a state variable is limited by a minimum value Xmin, then Xth≥Xmin, in other words x+dx/dt·dH≥Xmin and (Xmin−x−dx/dt·dH)≤0. The function h' corresponds to (Xmin−x−dx/dt·dH).

According to the second example, when a state variable is limited by a maximum value Xmax, then Xth≤Xmax, in other words x+dx/dt·dH≤Xmax and (Xmax−x−dx/dt·dH≥0. The function h' corresponds to (x+dx/dt·dH−Xmax).

It is the function h' that is used in the calculation of the Lagrangian.

The KKT parameter $\mu$ and the function h' are dimension vectors equal to the number of constraints to be considered for a state variable.

Second Scenario

For example, when the computer 40 determines the KKT parameter $\mu$ when two devices are capable of causing the energy consumption of the vehicle to vary and the computer therefore issues setpoints to two devices and the state variables of the system must satisfy at least two constraints, then:

$$\left. \begin{array}{l} L(q, u, \lambda, \mu) = H + \mu^T \cdot h' \\ \dfrac{\partial L}{\partial u_{(u=u^*)}} = 0 \; (vecteur\; dim\; n_u) \\ avec\; \mu\; (vecteur\; dim\; n_p) \end{array} \right\}$$

Where $n_u$ is equal to the number of devices to be controlled and where $n_p$ is equal to the number of inequality constraints to be considered.

$$\Rightarrow \frac{\partial H}{\partial u}\bigg|_{(u=u^*)} + \frac{\partial h\prime}{\partial u}\bigg|_{(u=u^*)} \cdot \mu = 0 \Leftrightarrow A \cdot \mu + b = 0$$

Therefore $$avec\; A = \frac{\partial h\prime}{\partial u}\bigg|_{(u=u^*)} :dim(n_u \times n_p)\; et\; b = \frac{\partial H}{\partial u}\bigg|_{(u=u^*)} :dim\; n_u$$

$$si\; n_u > n_p\; alors\; \mu = -\left(A^T \cdot A\right)^{-1} \cdot A^T \cdot b$$

$$si\; n_u < n_p\; alors\; \mu = -A^T \cdot \left(A \cdot A^T\right)^{-1} \cdot b$$

$$si\; n_u = n_p\; alors\; \mu = -A^{-1} \cdot b$$

According to the first and second examples, the method is implemented for the devices relating to the internal combustion engine M and therefore makes it possible to minimize the fuel consumption. However, the method could also be implemented on the basis of the devices relating to the electric machine $M_E$ and thus minimize the electrical energy consumption.

In addition, the method can be reiterated during the use of the vehicle. A new initial time is thus defined, and the prediction period dH is then defined on the basis of the new initial time defined.

The method thus makes it possible to obtain, by determining a range of applicable setpoints prior to the implementation of the Hamiltonian function and then the Lagrangian function, setpoint values for which the energy consumption of the vehicle, in relation to both fuel and electrical energy, is minimal.

The method also makes it possible to obtain setpoint values for which the energy consumption is minimal by considering the predicted values, in other words the possible change, of each state variable over a prediction period. The method makes it possible to determine all of the setpoints for which the energy consumption is minimal over a prediction period dH and not just at the present time.

The invention claimed is:

1. A method for optimizing the energy consumption of a motor vehicle including a fuel tank, an electric battery configured to supply electrical energy, an internal combustion engine powered by the fuel tank, at least one electric machine powered by the electrical energy supplied by the battery, at least one first device connected to the internal combustion engine, at least one second device connected to the electric machine, and a computer configured to manage a drive train of the motor vehicle on a predetermined route, the computer being configured to control the internal combustion engine by issuing an internal combustion setpoint and the electric machine by applying an electric setpoint, the internal combustion engine, the electric machine, the at least one first device connected to the internal combustion engine, and the at least one second device connected to the electric machine each being characterized by at least one state variable, each of the at least one state variable describing an operating state of the respective device that the at least one state variable characterizes, each of the at least one state variable being dependent on at least one state constraint and being defined by an initial value at an initial time, each of the setpoints being associated with at least one of the at least one state variable, the method comprising:

defining a prediction period starting from the initial time;

determining a maximum theoretical variation of each of the at least one state variable from the initial value of the respective state variable and over the prediction period so that each respective state variable satisfies all of the state constraints specific thereto;

determining a range of applicable setpoints comprising a set of values for each of the respective setpoints, each setpoint value (u) being selected so that the variation of each of the state variables satisfies the maximum theoretical variation determined for the respective state variable, all of the setpoint values (u) that satisfy one of: $(dx/dt(x,u)) \geq (Xmin-x)/dH$ and $(dx/dt(x,u)) \leq (Xmax-x)/dH$ being selected;

determining the value of the internal combustion setpoint and the value of the at least one electric setpoint, in the range of applicable setpoints determined, by carrying out the following operations for each respective setpoint:

determining optimum setpoints by minimizing a Hamiltonian of a system of equations modeling dynamics of the vehicle, in the range of applicable setpoints, and minimizing a Lagrangian function modeling the dynamics of the vehicle, the Lagrangian function being determined from the determined Hamiltonian and Karush-Kuhn-Tucker parameters ($\mu$) relating to the state constraints, in the full range of setpoints, comprising all of the setpoints, the Karush-Kuhn-Tucker parameters $\mu$ being determined so that the solution that minimizes the Hamiltonian in the range of applicable setpoints also minimizes the Lagrangian function in the full range:

1) $s_i$ $n_u > n_p$ then $\mu = -(A^T \cdot A)^{-1} \cdot A^T \cdot b$,

2) $s_i$ $n_u < n_p$ then $\mu = -A^T \cdot (A \cdot A^T)^{-1} \cdot A^T \cdot b$, 3) $s_i$ $n_u = n_p$ then $\mu = -A^{-1} \cdot b$, where: $n_u$ is equal to the number of devices to be controlled, $n_p$ is equal to the number of inequality constraints to be considered, $$A = \frac{\partial h'}{\partial u}_{(u=u^*)} : dim(n_u \times n_p)$$

$$b = \frac{\partial H}{\partial u}_{(u=u^*)} : dim \; n_u$$

h' denotes the equation that describes the constraint applied to the variation of the state variable predicted over a prediction period; and controlling internal combustion engine by issuing the determined internal combustion setpoint and the electric machine by applying the determined electric setpoint.

2. A computer for managing a drive train of a motor vehicle over a predetermined route, the motor vehicle including a fuel tank, an electric battery configured to supply electrical energy, an internal combustion engine powered by the fuel tank, at least one electric machine powered by the electrical energy supplied by the battery, at least one first device connected to the internal combustion engine, at least one second device connected to the electric machine the internal combustion engine, the electric machine, the at least one first device connected to the internal combustion engine, and the at least one second device connected to the electric machine each being characterized by at least one state variable, each of the at least one state variable describing an operating state of the respective device that the at least one state variable characterizes, each of the at least one state variable being dependent on at least one state constraint and being defined by an initial value at an initial time, each of the setpoints being associated with at least one of the at least one state variable, the computer comprising:

at least one processor configured to:

define a prediction period starting from the initial time, determine a maximum theoretical variation of each of the at least one state variable from the initial value of the respective state variable and over the prediction period so that each respective state variable satisfies all of the state constraints specific thereto, determine a range of applicable setpoints comprising a set of values for each of the respective setpoints, each setpoint value being selected so that the variation of each of the state variables satisfies each maximum theoretical variation determined for the respective state variable, all of the setpoint values (u) that satisfy one of: $(dx/dt(x,u)) \geq (Xmin-x)/dH$ and $(dx/dt(x,u)) \leq (Xmax-x)/dH$ being selected, determine the value of an internal combustion setpoint and the value of at least one electric setpoint, in the range of applicable setpoints determined, by, for each setpoint:

determining optimum setpoints by minimizing the Hamiltonian of a system of equations modeling dynamics of the vehicle, in the range of applicable setpoints determined, and minimizing a Lagrangian function modeling the dynamics of the vehicle, the Lagrangian function being determined from the determined Hamiltonian and Karush-Kuhn-Tucker parameters ($\mu$) relating to the state constraints, in the full range of setpoints, comprising all of the setpoints, the Karush-Kuhn-Tucker parameters $\mu$ being determined so that the solution that minimizes the Hamiltonian in the range of applicable setpoints also minimizes the Lagrangian function in the full range:

1) $s_i$ $n_u > n_p$ then $\mu = -(A^T \cdot A)^{-1} \cdot A^T \cdot b$,

2) $s_i$ $n_u < n_p$ then $\mu = -A^T \cdot (A \cdot A^T)^{-1} \cdot A^T \cdot b$, 3) $s_i$ $n_u = n_p$ then $\mu = -A^{-1} \cdot b$, where: $n_u$ is equal to the number of devices to be controlled, $n_p$ is equal to the number of inequality constraints to be considered, $$A = \frac{\partial h'}{\partial u}_{(u=u^*)} : dim(n_u \times n_p)$$

$$b = \frac{\partial H}{\partial u}_{(u=u^*)} : dim \; n_u$$

h' denotes the equation that describes the constraint applied to the variation of the state variable predicted over a prediction period, and control the internal combustion engine by issuing the determined internal combustion setpoint and the electric machine by applying the determined electric setpoint.

3. A motor vehicle comprising:

a fuel tank;

an electric battery configured to supply electrical energy;

an internal combustion engine powered by the fuel tank;

at least one electric machine powered by the electrical energy supplied by the battery;

at least one first device connected to the internal combustion engine;

at least one second device connected to the electric machine; and a computer configured to manage a drive train of a motor vehicle on a predetermined route, the computer being configured to control the internal combustion engine by issuing the internal combustion setpoint and the electric machine by applying the electric setpoint, the internal combustion engine, the electric machine, the at least one first device connected to the internal combustion engine and the at least one device connected to the electric machine each being characterized by at least one of the at least one state variable, each of the at least one state variable describing an operating state of the device that the at least one state variable characterizes, each of the at least one state variable being dependent on the at least one state constraint and being defined by the initial value at the initial time, each of the setpoints being associated with at least one of the at least one state variable, and the computer configured to:

define a prediction period starting from the initial time, determine a maximum theoretical variation of each of the at least one state variable from the initial value of the respective state variable and over the prediction period so that each respective state variable satisfies all of the state constraints specific thereto, determine a range of applicable setpoints comprising a set of values for each of the respective setpoints, each setpoint value being selected so that the variation of each of the state variables satisfies each maximum theoretical variation determined for the respective state variable, all of the setpoint values (u) that satisfy one of: $(dx/dt(x,u)) \geq (Xmin-x)/dH$ and $(dx/dt(x,u)) \leq (Xmax-x)/dH$ being selected, determine the value of an internal combustion setpoint and the value of at least one electric setpoint, in the range of applicable setpoints determined, by, for each setpoint:

determining optimum setpoints by minimizing the Hamiltonian of the system of equations modeling dynamics of the vehicle, in the range of applicable setpoints determined, and minimizing a Lagrangian function modeling the dynamics of the vehicle, the Lagrangian function being determined from the determined Hamiltonian and Karush-Kuhn-Tucker parameters ($\mu$) relating to the state constraints, in the full range of setpoints, comprising all of the setpoints, the Karush-Kuhn-Tucker parameters u being determined so that the solution that minimizes the Hamiltonian in the range of applicable setpoints also minimizes the Lagrangian function in the full range:

1) s$_i$ $n_u > n_p$ then $\mu = -(A^T \cdot A)^{-1} \cdot A^T \cdot b$,
2) s$_i$ $n_u < n_p$ then $\mu = -A^T \cdot (A \cdot A^T)^{-1} \cdot A^T \cdot b$,
3) s$_i$ $n_u = n_p$ then $\mu = -A^{-1} \cdot b$, where: $n_u$ is equal to the number of devices to be controlled, $n_p$ is equal to the number of inequality constraints to be considered, $$A = \frac{\partial h'}{\partial u}_{(u=u')} : dim(n_u \times n_p)$$

-continued $$b = \frac{\partial H}{\partial u}_{(u=u')} : dim \; n_u$$

h' denotes the equation that describes the constraint applied to the variation of the state variable predicted over a prediction period, and control the internal combustion engine by issuing the determined internal combustion setpoint and the electric machine by applying the determined electric setpoint.

4. A non-transitory computer program product configured to cause one or more processors to execute a set of program code instructions which, when executed by the one or more processors, configure the one or more processors to implement a method for optimizing the energy consumption of a motor vehicle including a fuel tank, an electric battery configured to supply electrical energy, an internal combustion engine powered by the fuel tank, at least one electric machine powered by the electrical energy supplied by the battery, at least one first device connected to the internal combustion engine, at least one second device connected to the electric machine, and a computer configured to manage a drive train of the motor vehicle on a predetermined route, the computer being configured to control the internal combustion engine by issuing an internal combustion setpoint and the electric machine by applying an electric setpoint, the internal combustion engine, the electric machine, the at least one first device connected to the internal combustion engine, and the at least one second device connected to the electric machine each being characterized by at least one state variable, each of the at least one state variable describing an operating state of the respective device that the at least one state variable characterizes, each of the at least one state variable being dependent on at least one state constraint and being defined by an initial value at an initial time, each of the setpoints being associated with at least one of the at least one state variable, the method comprising:

defining a prediction period starting from the initial time;

determining a maximum theoretical variation of each of the at least one state variable from the initial value of the respective state variable and over the prediction period so that each respective state variable satisfies all of the state constraints specific thereto;

determining a range of applicable setpoints comprising a set of values for each of the respective setpoints, each setpoint value being selected so that the variation of each of the state variables satisfies the maximum theoretical variation determined for the respective state variable, all of the setpoint values (u) that satisfy one of: $(dx/dt(x,u)) \geq (Xmin-x)/dH$ and $(dx/dt(x,u)) \leq (Xmax-x)/dH$ being selected;

determining the value of the internal combustion setpoint and the value of the at least one electric setpoint, in a range of applicable setpoints determined, by carrying out the following operations for each respective setpoint:

determining optimum setpoints by minimizing a Hamiltonian of a system of equations modeling dynamics of the vehicle, in the range of applicable setpoints, and minimizing a Lagrangian function modeling the dynamics of the vehicle, the Lagrangian function being determined from the determined Hamiltonian and Karush-Kuhn-Tucker parameters ($\mu$) relating to the state constraints, in the full range of setpoints, comprising all of the setpoints, the Karush-Kuhn-Tucker parameters $\mu$ being determined so that the solution that minimizes the Hamiltonian in the range of applicable setpoints also minimizes the Lagrangian function in the full range:

1) $s_i$ $n_u > n_p$ then $\mu = -(A^T \cdot A)^{-1} \cdot A^T \cdot b$,

2) $s_i$ $n_u < n_p$ then $\mu = -A^T \cdot (A \cdot A^T)^{-1} \cdot A^T \cdot b$, 3) $s_i$ $n_u = n_p$ then $\mu = -A^{-1} \cdot b$, where: $n_u$ is equal to the number of devices to be controlled, $n_p$ is equal to the number of inequality constraints to be considered, $$A = \frac{\partial h'}{\partial u}_{(u=u')} : dim(n_u \times n_p)$$

$$b = \frac{\partial H}{\partial u}_{(u=u')} : dim\ n_u$$

h' denotes the equation that describes the constraint applied to the variation of the state variable predicted over a prediction period; and controlling the internal combustion engine by issuing the determined internal combustion setpoint and the electric machine by applying the determined electric setpoint.

\*    \*    \*    \*    \*